(12) United States Patent
Wang

(10) Patent No.: US 11,604,162 B2
(45) Date of Patent: Mar. 14, 2023

(54) OPTICAL SYSTEMS AND METHODS FOR SAMPLE SEPARATION

(71) Applicant: LIFE TECHNOLOGIES CORPORATION, Carlsbad, CA (US)

(72) Inventor: Shaohong Wang, Pleasanton, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 745 days.

(21) Appl. No.: 16/488,328

(22) PCT Filed: Feb. 23, 2018

(86) PCT No.: PCT/US2018/019542
§ 371 (c)(1),
(2) Date: Aug. 23, 2019

(87) PCT Pub. No.: WO2018/156969
PCT Pub. Date: Aug. 30, 2018

(65) Prior Publication Data
US 2020/0011831 A1 Jan. 9, 2020

Related U.S. Application Data

(60) Provisional application No. 62/463,528, filed on Feb. 24, 2017.

(51) Int. Cl.
*G01J 3/02* (2006.01)
*G01N 27/447* (2006.01)
(Continued)

(52) U.S. Cl.
CPC ...... *G01N 27/44721* (2013.01); *G01J 3/0208* (2013.01); *G01J 3/0218* (2013.01);
(Continued)

(58) Field of Classification Search
CPC ........ G01N 27/44721; G01N 27/44791; G01J 3/0208; G01J 3/0218; G01J 3/0289;
(Continued)

(56) References Cited

U.S. PATENT DOCUMENTS

| 5,324,401 A | 6/1994 | Yeung et al. |
| 5,730,850 A * | 3/1998 | Kambara ......... G01N 27/44782 |
| | | 204/603 |
| 5,790,727 A * | 8/1998 | Dhadwal ................. G02B 6/26 |
| | | 385/115 |

(Continued)

FOREIGN PATENT DOCUMENTS

| CN | 106018403 A | 10/2016 |
| JP | 2010-96778 A | 4/2010 |

(Continued)

OTHER PUBLICATIONS

International Preliminary Report on Patentability for Application No. PCT/US2018/019542, dated Sep. 6, 2019, 12 pages.
International Search Report and Written Opinion for Application No. PCT/US2018/019542, dated Jul. 23, 2018, 17 pages.
(Continued)

*Primary Examiner* — Abdullahi Nur
(74) *Attorney, Agent, or Firm* — Mauriel Kapouytian Woods LLP; Michael Mauriel

(57) ABSTRACT

A system for separating biological molecules includes a plurality of capillaries (101), a capillary mount (102), a plurality of optical fibers (145a, 145b), a fiber mount (603), an optical detector (138), and a motion stage (606). The plurality of capillaries (101) are configured to separate biological molecules in a sample. Each capillary (101) comprising a detection portion (121) configured to pass electromagnetic radiation into the capillary (101). The plurality of capillaries (101) are coupled to the capillary mount (102) such that the detection portions (121) are fixedly (Continued)

located relative to one another. Each optical fiber (145) includes a receiving end to receive emissions. The optical fibers (145) are coupled to the fiber mount (603) such that the receiving ends of the optical fibers are fixedly located relative to one another. The optical detector (138) is configured to produce an alignment signal. The motion stage (606) is configured to align the receiving ends of the optical fibers (145) to the detection portions (121) based on values of the alignment signal.

16 Claims, 9 Drawing Sheets

(51) Int. Cl.
*G01J 3/18* (2006.01)
*G01J 3/44* (2006.01)

(52) U.S. Cl.
CPC .......... *G01J 3/0289* (2013.01); *G01J 3/0294* (2013.01); *G01J 3/18* (2013.01); *G01J 3/4406* (2013.01); *G01N 27/44791* (2013.01)

(58) Field of Classification Search
CPC .... G01J 3/0294; G01J 3/18; G01J 3/14; G01J 3/02; G01J 3/28; G01J 3/44; G01J 3/4406
See application file for complete search history.

(56) References Cited

U.S. PATENT DOCUMENTS

| | | |
|---|---|---|
| 5,903,348 A | 5/1999 | Melman et al. |
| 6,942,773 B1* | 9/2005 | Olivares .......... G01N 27/44721 |
| | | 204/603 |
| 7,005,052 B2* | 2/2006 | Shimizu .......... G01N 27/44721 |
| | | 204/603 |
| 2010/0213063 A1 | 8/2010 | Zenhausern et al. |
| 2017/0016853 A1 | 1/2017 | Maher |
| 2018/0335408 A1* | 11/2018 | Farnsworth ............ G01N 21/33 |

FOREIGN PATENT DOCUMENTS

| | | |
|---|---|---|
| JP | 2016-14609 A | 1/2016 |
| JP | 2016-133373 A | 7/2016 |
| WO | WO-0102846 A1 | 1/2001 |
| WO | WO-02059592 A2 | 8/2002 |

OTHER PUBLICATIONS

PCT/US2018/019542, Partial Search Report, dated May 30, 2018.
Office Action issued in Japanese Patent Application No. 2019-546190 dated Jan. 31, 2022, 6 pages.
Decision of Grant issued in Japanese Patent Application No. 2019-546190 dated Apr. 18, 2022, 4 pages.

* cited by examiner

FIG. 1
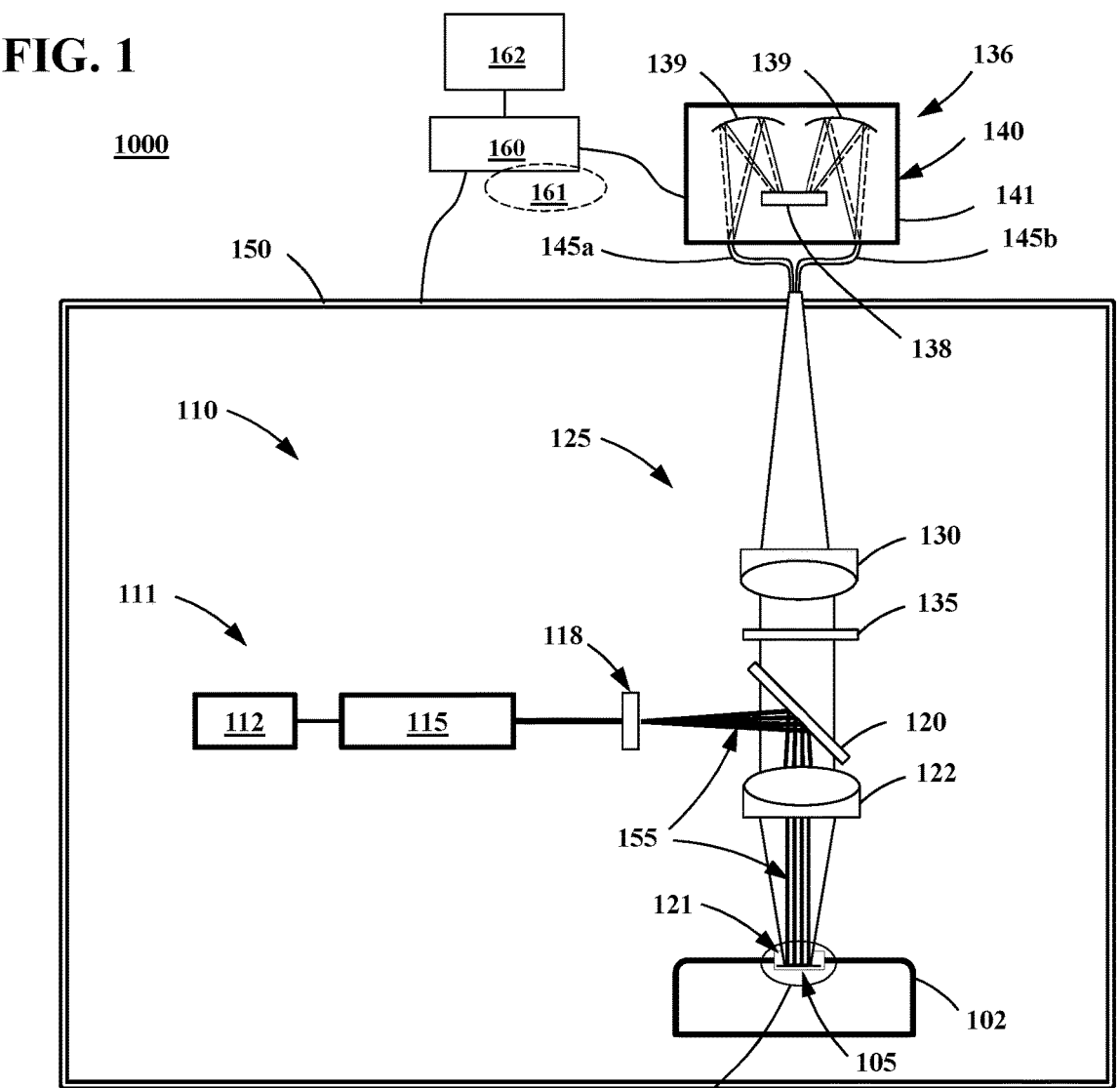
Magnified View
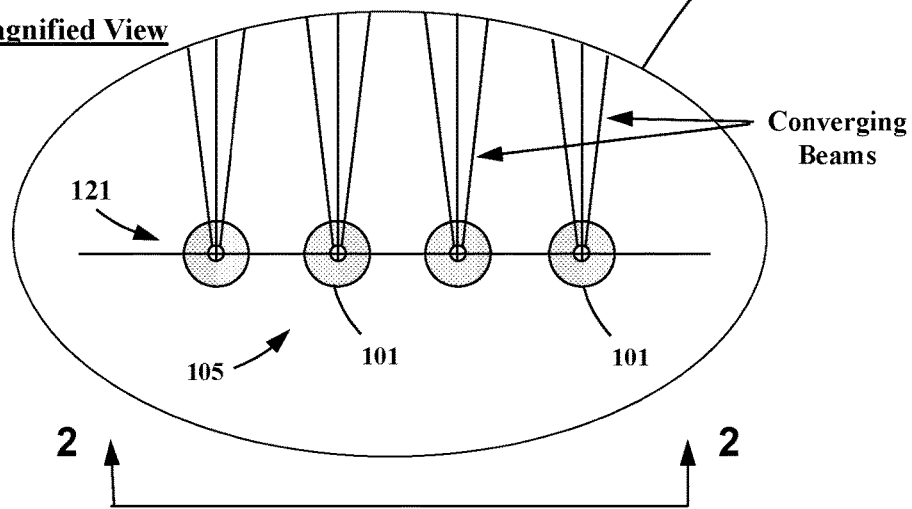

FIG. 2
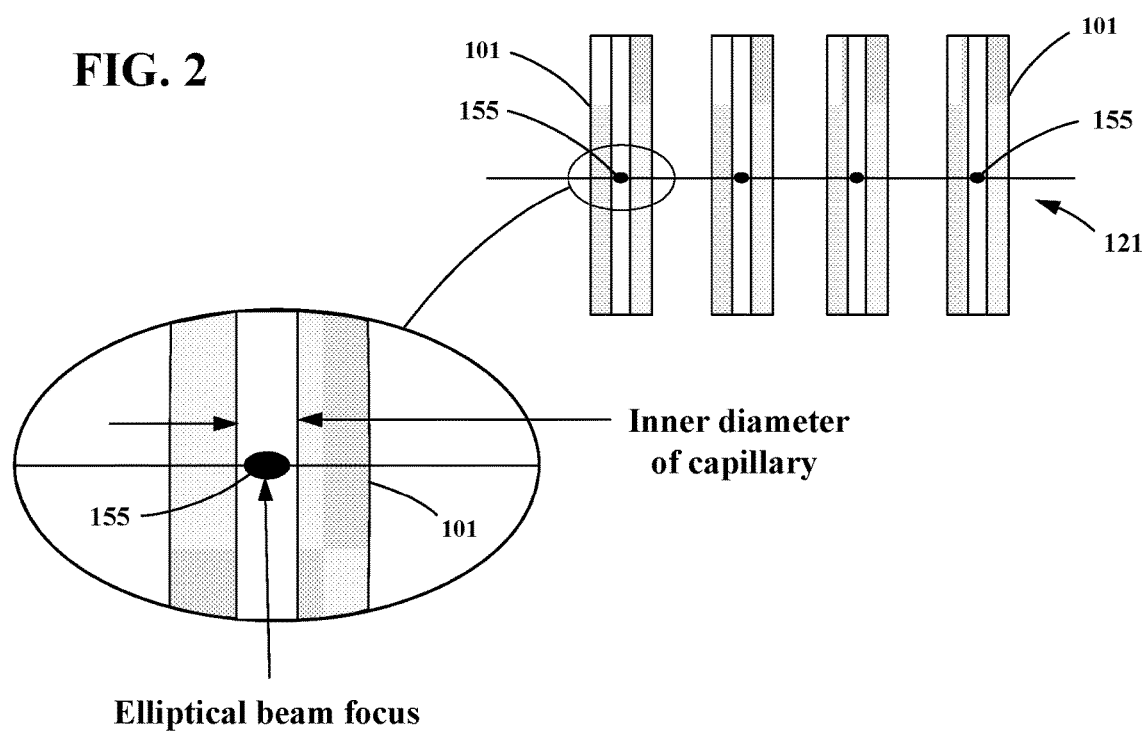
Inner diameter of capillary
Elliptical beam focus
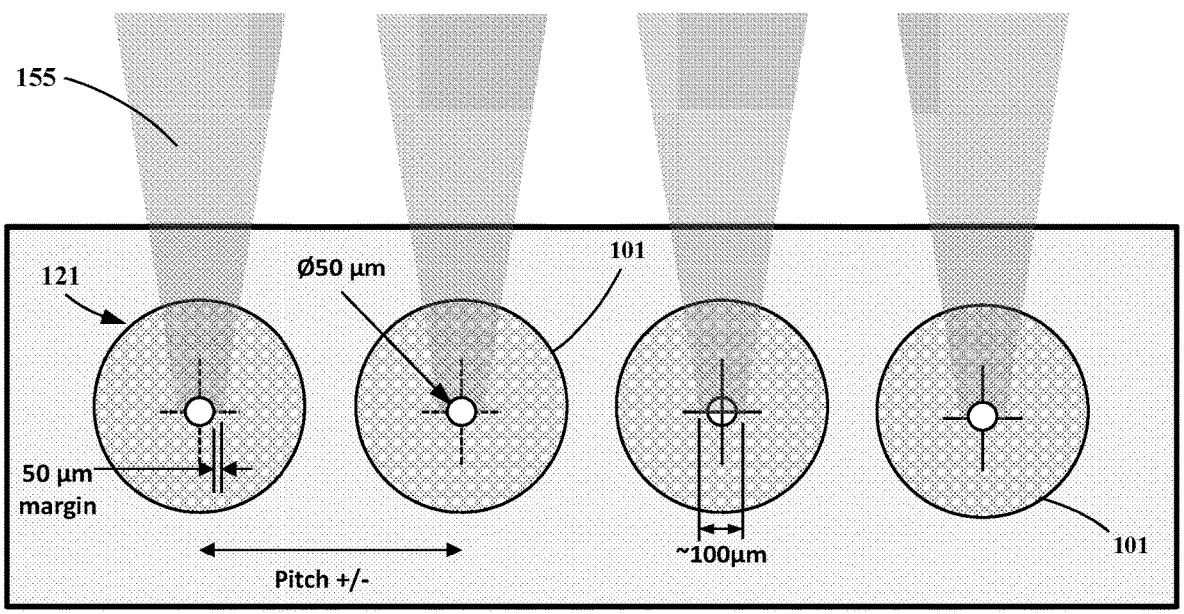
FIG. 3  Capillary cross section

OPTICAL SYSTEMS AND METHODS FOR SAMPLE SEPARATION

BACKGROUND OF THE INVENTION

Field of the Invention

The present invention relates generally to sample separation systems, instruments, devices, and methods, and more specifically to optical sample separation systems, instruments, devices, and methods utilizing a plurality of sample capillaries for performing a sample separation assay, process, test, or experiment.

Description of the Related Art

Sample separation devices, such as capillary electrophoresis devices, generally provide certain major components that include, for example, a capillary channel or array of channels, a separation medium source for providing a medium that may flow through the capillaries (e.g., a polymer fluid), a sample injection mechanism, an optical detector system or component, electrodes for producing an electric field, an anode buffer source on one end of the capillaries, and a cathode buffer source on the other end of the capillaries. Capillary electrophoresis devices generally also provide various heating components and zones to regulate the temperature of many of the aforementioned components. Regulating the temperature of many of these components can improve quality of results.

Current capillary electrophoresis devices use multiple structures to house these various components and connect or couple these structures together to provide a working capillary electrophoresis device or system. Using multiple structures has disadvantages. It is therefore desirable to provide a capillary electrophoresis apparatus with a reduced number of interconnected structures, for example, to reduce the number of necessary heating zones, reduce user handling of the structures, reduce likelihood of component failure, and reduce introduction of bubbles and other artifacts into the apparatus.

SUMMARY OF INVENTION

Embodiments of the present invention are generally directed to systems, instruments, devices, and methods for performing sample separation assays, processes, tests, or experiments. One aspect of the present invention involves incorporation of various components of a sample separation system or instrument into a common cartridge, cassette, or case that may be advantageously loaded into the system or instrument in a way that simplifies set up for a preforming a sample separation assay, process, test, or experiment. Another aspect of the present invention involves a sample separation cartridge, cassette, or case having an optical section that, upon loading into a sample separation system or instrument, can be aligned to an optical system and/or detector in a manner that is advantageously simple, accurate, and stable. In yet another aspect of the present invention, involves a sample separation system or instrument comprising an illumination optical configuration that advantageously reduces optical noise, for example, optical noise created by Raman scattering by water molecules within a sample solution contained in one or more capillaries used during, or in preparation for, a sample separation assay, process, test, or experiment.

BRIEF DESCRIPTION OF THE DRAWINGS

FIG. 1 illustrates a system for capillary electrophoresis (CE) or similar assay in accordance with some embodiments of the disclosure.

FIG. 2 illustrates further details of the CE system of FIG. 1 in accordance with some embodiments of the disclosure.

FIG. 3 illustrates further details of the CE system of FIG. 1 in accordance with some embodiments of the disclosure.

DETAILED DESCRIPTION OF THE DRAWINGS

Figure 4:
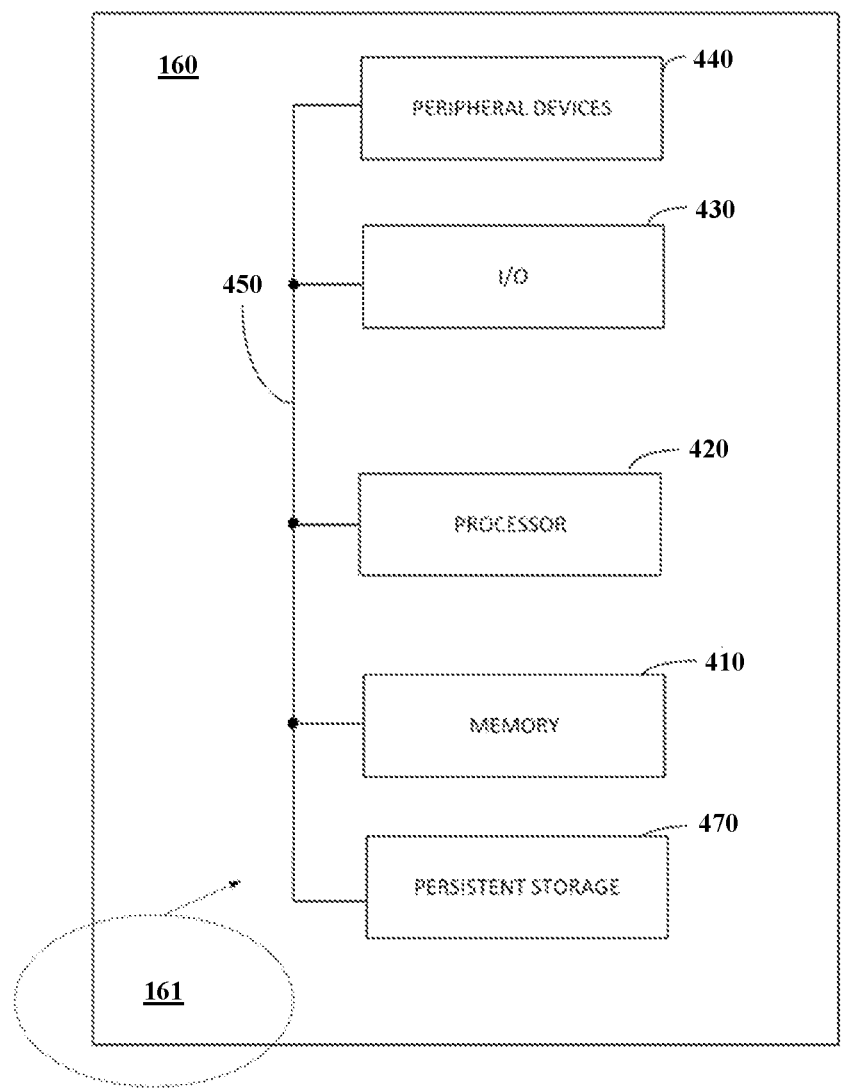
FIG. 4 illustrates further details of the computer processing system shown in FIG. 1, in accordance with some embodiments of the disclosure.

The following description provides embodiments of the present invention, which are generally directed to systems, instruments, devices, and methods for preparing, observing, testing, and/or analyzing biological samples. Such description is not intended to limit the scope of the present invention, but merely to provide a description of embodiments.

Exemplary systems and methods related to the various embodiments described in this document include those described in following applications:

U.S. patent application Ser. No. 15/124,013, filed on Mar. 7, 2014;
U.S. patent application Ser. No. 15/124,129, filed on Mar. 7, 2014;
U.S. patent application Ser. No. 15/124,168, filed on Mar. 7, 2014;
U.S. design patent application No. 29/591,445, filed on Jan. 19, 2017;
U.S. design patent application No. 29/591,865, filed on Jan. 24, 2017;
U.S. design patent application No. 29/591,867, filed on Jan. 24, 2017;
U.S. provisional patent application No. 62/460,700, filed on Feb. 17, 2017;
U.S. provisional patent application No. 62/463,467, filed on Feb. 24, 2017;
U.S. provisional patent application No. 62/463,551, filed on Feb. 24, 2017;
U.S. provisional patent application No. 62/463,528, filed on Feb. 24, 2017.

Embodiments of the present invention may include various sample separation systems and methods including, but not limited to, capillary electrophoresis, chip based electrophoresis, lab-on-a-chip microfluidics, gel electrophoresis, electro-osmosis, chromatography, flow cytometry, and the like. Example embodiments of the present invention will be presented for capillary electrophoresis systems or instruments in order to demonstrate various aspects of the present invention that may be applicable to other separation systems, such as chip based electrophoresis and the like.

As used herein the terms "radiation" or "electromagnetic radiation" means radiant energy released by certain electromagnetic processes that may include one or more of visible light (e.g., radiant energy characterized by one or more wavelengths between 400 nanometers and 700 nanometers or between 380 nanometers and 800 nanometers) or invisible electromagnetic radiations (e.g., infrared, near infrared, ultraviolet (UV), X-ray, or gamma ray radiation).

As used herein a "radiant source" means a source of electromagnetic radiation that may be directed toward at least one sample mixture or solution in order to produce a detectable signal for determining the presence and/or quantity of one or more target sample molecules or compounds contained within the at least one sample mixture or solution. The radiant source may comprise a single source of light, for example, an incandescent lamp, a gas discharge lamp (e.g., Halogen lamp, Xenon lamp, Argon lamp, Krypton lamp, etc.), a light emitting diode (LED), an organic LED (OLED), a laser (e.g., chemical laser, excimer laser, semiconductor laser, solid state laser, Helium Neon laser, Argon laser, dye laser, diode laser, diode pumped laser, fiber laser, pulsed laser, continuous laser), or the like. Alternatively, the radiant source may comprise a plurality of individual sources (e.g., a plurality of LEDs or lasers). The radiant source may also include one or more excitation filters, such as a high-pass filter, a low-pass filter, or a band-pass filter. For example, the excitation filter comprise a colored filter and/or a dichroic filter. The radiant source may continuous or pulsed, and may comprise either a single beam or a plurality of beams that are spatially and/or temporally separated. The radiant source may be characterized by electromagnetic radiation that is primarily within the visible light range (e.g., a "light source" emitting electromagnetic radiation within a wavelength in the range of 400 nanometers to 700 nanometers or in the range of 380 nanometers and 800 nanometers), near infrared range, infrared range, ultraviolet range, or other ranges within the electromagnetic spectrum.

Referring to FIG. 1, certain embodiments of the present invention comprise a system or instrument 1000 for performing a capillary electrophoresis or similar assay, process, test, or experiment. System 1000 comprises one or more capillaries, tubes, or channels 101 (four are shown in FIG. 1) located on or in a capillary housing, holder, or mount 102. Each capillary may comprise a detection portion configured to pass electromagnetic radiation into and/or out of the capillary. In the illustrated embodiment, a capillary array 105 comprises four capillaries 101; however, capillary array 105 may include more than four capillaries, for example, to provide higher throughput or shorter assay runs. Configurations of instrument 1000 may include 1, 2, 4, 8, 10, 12, 16, 24, 32, 48, 65, 96, 128, 256, 384, or more than 384 capillaries 101.

System 1000 further comprises an optical system 110 comprising an illumination or excitation optical system 111 comprising any or all of a radiant source 112, a beam shaper or conditioner 115, a beam divider 118, and/or a beamsplitter or mirror 120. Radiant source 112 is configured to illuminate an optical detection access or optical detection zone 121 of system 1000 and/or capillaries 101 in which electromagnetic radiation (e.g., light, near infrared, or ultraviolet) may pass into and/or out of the detection portion of the one or more capillaries 101 in order to detect or measure a target, calibration, or other molecules of interest. Optical system 110 may further comprise a lens 122 and an emission optical system 125. Emission optical system 125 may comprise lens 122, a lens 130, an emission filter 135, and a detection system 136. Radiant source 112 may comprise one or more of the types of radiant sources discussed above herein. In certain embodiments radiant source 112 comprises a diode pumped solid state (DPSS) laser having a wavelength of 505 nanometers.

Detection system 136 comprises a detector 138 configured to receive emissions from the optical detection zone 121 of capillaries 101, for example to receive fluorescent emissions produced by fluorescent dyes, probes, or markers attached to target or other molecules of interest. Detector 138 may be an optical detector comprising one or more individual photodetectors including, but not limited to, photodiodes, photomultiplier tubes, bolometers, cryogenic detectors, quantum dots, light emitting diodes (LEDs), semiconductor detectors, HgCdTe detectors, or the like. Additionally or alternatively, detector 138 may be an optical detector comprising an array sensor including an array of sensors or pixels. The array sensor may comprise one or more of a complementary metal-oxide-semiconductor sensor (CMOS), a charge-coupled device (CCD) sensor, a plurality of photodiodes detectors, a plurality of photomultiplier tubes, or the like. In certain embodiments, detector 138 comprises two or more array sensors.

An optical system such as emission optical system 125 may be used to collect emissions from each capillary 101. In the illustrated embodiment in FIG. 1, lens 122 is doublet lens configured to collect emission light from each of the one or more capillaries 101 and lens 130 is a doublet lens configured to reimage the emissions from each of the one or more capillaries 101 to a spot or focus in an image plane of emission optical system 125. However, other optical configurations known in the art may be used for these purposes.

For applications in which multiple emissions at different wavelengths are produced in each of the one or more capillaries 101, detection system 136 may further comprise one or more spectral dispersion elements 139 that spread the spectral content contained in different fluorescent signal to different parts (e.g., different groups of pixels) of detector 138. In the illustrated embodiment shown in FIG. 1, four spectral dispersion elements 139 are incorporated into a spectrometer 140 (two spectral dispersion elements 139 are visible in FIG. 1 and two more spectral dispersion elements 139 are located behind the two visible in FIG. 1). Spectrometer 140 may further comprise detector 138. Detection system 136 may be disposed within a housing or enclosure 141.

Spectrometer 140 may be optically coupled to capillaries 101 and/or emission optical system 125 via one or more fibers or optical fibers 145. In the illustrated embodiment, a first pair or bundle of optical fibers 145a is configured to receive emission light from first and second capillaries 101 of capillary array 105 and a second pair or bundle of optical fibers 145b is configured to receive emission light from third and fourth capillaries 101 of capillary array 105. Additionally or alternatively, optical fibers 145 may be grouped together into a single fiber bundle or each fiber 145 may be separate from the remaining optical fibers 145. Spectrometer 140 may further comprise the one or more spectral dispersion elements 139 and the detector 138, wherein each spectral dispersion element 139 is configured to direct emission light from a different one of capillaries 101 onto a different region of detector 138. Spectral dispersion elements 139 may comprise one or more prisms, diffractive optical elements, holographic optical elements, or the like. Spectral dispersion elements 139 may comprise reflective or transmissive optical elements. The use of optical fibers 145 have been discovered to advantageously simplify alignment and calibration of detector 138 for multi-fluorescent wavelength application, as discuss below herein.

In certain embodiments, optical system 110, the one or more capillaries 101, and capillary mount 102 are disposed inside of a common housing or enclosure 150 and spectrometer 140 is located outside housing 150 in housing 141. Alternatively, spectrometer 140 and/or housing 141 may be located within housing 150 or directly attached to housing 150. Housing 141 may include an opening or port to allow transfer of radiation or light from capillaries 101 to spectrometer 140. Spectrometer 140 may be contained in a separate housing, as shown in FIG. 1, or included inside the same instrument housing as the optical system. In contrast to the embodiment shown in FIG. 1, the one or more capillaries 101 and/or some of associated hardware may be located outside housing 150, in which case an interface with system 1000 may be provided via an opening or port in housing 150.

In certain embodiments, optical fibers 145 are part of spectrometer 140. Alternatively, optical fibers 145 may be separate from spectrometer 140, wherein the optical fibers 145 are attached to spectrometer 140 using an optical coupler (not shown). In the illustrated embodiment, spectral dispersion elements 139 are advantageously configured to both disperse and focus incident emissions received from optical fiber 145 onto detector 138.

During use, capillaries 101 may contain a polymer or similar solution configured to support an electric field or current. The polymer or similar solution is configured to permit the transfer or migration of one or more samples that may include one or more fluorescent dyes, probes, markers, or the like. The fluorescent dyes, probes, markers, or the like may be selected to produce a fluorescent signal during use that may be correlated to the presence or amount of one or more target molecules or sequences of molecules present at a given time within optical detection zone 121. The fluorescent signal(s), light, or radiation produced within any or all of capillaries 101 may be directed back through lens 122 and the mirror so as to be received by spectrometer 140.

Referring again to FIG. 1, in certain embodiments, system 1000 may comprise conditioner 115 and radiation from radiant source 112 passes through conditioner 115. Conditioner 115 may comprise a homogenizer configured, for example, to blend different color or wavelength radiant sources and/or to provide a more even illumination cross-section of the output beam. Additionally or alternatively, system 1000 may comprise divider 118. Additionally or alternatively, emitted radiation from radiant source 112 may pass through beam divider 118 to provide a plurality of excitation, sample, illumination, or source beams 155, each source beam 155 characterized by one or more of, one or more beam diameters, a cross-sectional shape (e.g., square, circular, or elliptical), a predetermined intensity or power profile (e.g., constant, top hat, Gaussian, etc.).

As illustrated in FIG. 2, beam conditioner 115 and beam divider 118 may be configured to produce or provide source beams 155, where each source beam 155 comprising an elliptical cross section or shape. Beam conditioner 115 may comprise an anamorphic beam shaper, for example, comprising one or more cylindrical lenses configured to produce beams having an elliptical cross section, wherein the beam cross section is wider in one axis than in the other perpendicular axis. Alternatively, beam conditioner 115 may comprise a Powell lens, for example, configured to provide a line focus and/or an elliptical beam cross section in which an intensity or power over a cross section of the beam uniform, or nearly uniform. In addition, beam conditioner 115 may be configured so that any diameter of the beam is greater than or less than the diameter of the beam entering beam conditioner 115. In the illustrated embodiment, the beam exiting beam conditioner 115 is collimated. The elliptical cross section of each of source beam 155 may be oriented so that the long axis or dimension is oriented perpendicular or nearly perpendicular to an axis of the associated capillary 101. This orientation of each source beam 155 and its focus has been found to advantageously reduce the sensitivity of the alignment of the capillary array 105 to the beams. In the illustrated embodiment shown in FIG. 2, the long diameter of the beam focus is less than an inner diameter of an individual capillary 101. Alternatively, as illustrated in FIG. 3, the long diameter of the focused source beams 155 may be larger than the inner diameter of the individual capillaries 101. FIG. 3 also illustrates the diameters and pitch of capillaries 101 within the array for certain embodiments. As seen in FIG. 3, the inner diameter of each capillary 101 is 50 micrometers, while the focused beam has a diameter of about 100 micrometers.

Referring again to FIG. 1, the excitation beam out of conditioner 115 enters beam divider 118, which may be configured to produce a plurality of identical or similar source beams 155 from a single input beam into beam divider 118. As an example, beam divider 118 may comprise one or more diffractive optical elements, holographic optical elements, or the like, that is configured to produce or provide four elliptical beams for illuminating each of the four capillaries 101, as seen in FIGS. 1-3. The four source beams 155 have the same or a similar cross-section, and each beam diverges at a different angle relative to a system optical axis or general directions of light propagation. Alternatively, beam divider 118 may be configured to produce a plurality of beams that are parallel to one another or that converge relative to one another. In the illustrated embodiment, the beams out of beam divider 118 are collimated; however, some or all of the beams may alternatively be converging or diverging as they leave beam divider 118. Source beams 155 originating from beam divider 118 may each be collimated as they enter lens 122, but be divergent from one another. In such embodiments, lens 122 may be configured focus each of source beam 155 to a location at or near a respective capillary 101, as illustrated in the magnified view of FIG. 1. In addition, lens 122 and the source beams 155 out of beam divider 118 may be configured such that the individual beams 155 are each collimated relative to one another (e.g., the four beams in FIG. 1 may all travel parallel to one another after exiting lens 122).

Source beams 155 out of beam divider 118 in FIG. 1 may be reflected by a mirror 120 and directed toward capillaries 101. Additional mirrors and/or diffractive elements may be included as desired to direct the four beams toward capillaries 101, for example, to meet packaging constraints. The beams from beam divider 118 continue to diverge after reflection off the mirror until they are received by lens 122. Mirror 120 may be a dichroic mirror, or the like, which may be configured to reflect light at a predetermined wavelength or light over a predetermined wavelength range, while transmitting light or other electromagnetic radiation that is outside the predetermined wavelength or wavelength range. In some embodiments, mirror 120 comprises a dichroic mirror having more than one predetermined wavelength or wavelength range, for example, when the radiant source comprises more than one distinct wavelength or wavelength range. In the illustrated embodiment, the source beams 155 from beam divider 118 are reflected by mirror 120, while emitted radiation from optical detection zone 121 is transmitted or largely transmitted by mirror 120. Alternatively, the location of capillaries 101 may be located along the optical axis of beam divider 118 and mirror 120 may be configured to transmit, or largely transmit, the excitation beams, while reflecting emissions from the optical detection zone 121.

Emission filter 135 may be located between lenses 122, 130 and may be configured block or attenuate light from the radiant source, thereby eliminating or reducing the about of light from the radiant source that is receive by spectrometer 140. In certain embodiments, the focal length of lenses 122, 130 are selected to produce a magnification of capillaries 101, or of emission radiation from capillaries 101, that is different than one (e.g., to produce a magnified or demagnified image). For example, lens 122 may be selected to have a numerical aperture (NA) that is twice the NA of the lens 130, resulting in a system magnification of two. In certain embodiments, lens 122, 130 has an NA of 0.4 and lens 130 has an NA of 0.2. In some embodiments, the focal length or NA of lenses 122, 130 may be selected to (1) provide a focal spot, or focal point, at or near capillary array 105 that has a predetermined size or diameter and (2) simultaneously providing an NA that is matched to the NA of spectrometer 140 and/or the NA of the optical fiber system used to transfer light into spectrometer 140.

Source beams 155 are configured to illuminate samples within optical detection zone 121 of each of the capillaries 101 to produce respective emissions, for example fluorescent emissions produced by fluorescent dyes, probes, or markers attached to the target molecules or molecules of interest. The emissions may be configured to indicate the presence or amount of target molecules or molecules of interest. The emissions may be focused or re-image onto a plane using lenses 122, 130 or some other suitable emission optical system. Emission filter 135 may be configured to filter out unwanted radiation, such as excitation light produced by radiant source 112. Alternatively, as shown illustrated in FIG. 1, emission light from capillaries 101 may be focused or re-image onto to input or receiving ends of optical fibers 145, then propagated by optical fibers 145 into spectrometer 140. Each fiber 145 may be associated with (e.g., receive radiation from) a corresponding one of capillaries 101. Using optical fibers 145, radiation from capillaries 101 is then transferred into spectrometer 140, where it is dispersed by wavelength onto a detector 138. In the illustrated embodiment, emission radiation from optical fibers 145*a* enter on one side of spectrometer 140 and radiation from optical fibers 145*b* enter on another side of spectrometer 140. In this manner, the spectrum from each of fiber 140 (or capillaries 101) is directed onto a different portion of detector 138. This configuration has been found to advantageously allow the spectrum from each of multiple capillaries 101 to be produced and detected simultaneously on a single or reduced number of array detectors 138. Detector 138 may be configured to receive the emissions from the samples contained in capillaries 101 and to produce emission signal that may be further processed. For example, spectrometer 140 may be configured to separate the signals created by different fluorescent dyes, probes, or markers, for example, created by dyes, or probes, markers corresponding to different DNA or RNA bases (e.g., adenine, thymine (or uracil), cytosine, and guanine). System 1000 may further comprise a computer or processing system 160 including a data processing system, a computer program product 161 configured to program processing system 160, and display or other output device 162. Processing system 160 may be used to control or obtain data from system 1000, for example, to monitor and/or control one or more electrical parameters (e.g., radiant source power, detector supply power, cathode/anode voltage, or current through one or more of each capillary 101 or a group of the capillaries 101) or to measure or control various run or process parameters such as temperature or pressure (e.g., system or capillary 101 temperature, pressure of a pump or syringe for filling capillaries 101 with a polymer solution or the like). Processing system 160 may be coupled to detection system 136, for example to provide read detected fluorescence signals. In certain embodiments, detection system 136 passes a signal to processing system 160 corresponding to the intensity of emissions received at various wavelengths scanned by detection system 136. Computer program product 161 may be used to configure processing system 160 to process received spectral data from detection system 136 that may be used during runtime of instrument 1000 to calibrate instrument 1000 or to correct for spectral error, for example, as disclosed in U.S. provisional patent application 62/460, 700. Display or other output device 162 is coupled to processing system 160 and may be used to display or report data related to an assay, process, test, or experiment such as run parameter values, spectral data, run condition data, run quality data, warning flags, and the like, for example, as disclosed in U.S. provisional patent application No. 62/463, 551.

Referring to FIG. 4, computer or processing system 160 may be configured to execute instruction codes contained in a computer program product 161. Computer program product 161 may comprise executable code in an electronically readable medium that may instruct one or more computers such as computer or processing system 160 to perform processing that accomplishes the exemplary method steps performed by the embodiments discussed herein. The electronically readable medium may be any non-transitory medium that stores information electronically and may be accessed locally or remotely, for example via a network connection.

In alternative embodiments, the medium may be transitory. The medium may include a plurality of geographically dispersed media each configured to store different parts of the executable code at different locations and/or at different times. The executable instruction code in an electronically readable medium directs the illustrated computer or processing system 160 to carry out various exemplary tasks described herein. The executable code for directing the carrying out of tasks described herein would be typically realized in software or firmware. However, it will be appreciated by those skilled in the art that computers or other electronic devices might utilize code realized in hardware to perform many or all the identified tasks without departing from the present invention. Those skilled in the art will understand that many variations on executable code may be found that implement exemplary methods within the spirit and the scope of the present invention.

The code or a copy of the code contained in computer program product 161 may reside in one or more storage persistent media (not separately shown) communicatively coupled to computer or processing system 160 for loading and storage in persistent storage device 470 and/or memory 410 for execution by a processor 420. Computer or processing system 160 also includes I/O subsystem 430 and peripheral devices 440 (e.g., display or output device 162). I/O subsystem 430, peripheral devices 440, processor 420, memory 410, and persistent storage device 470 may be coupled via a common bus 450. Like persistent storage device 470 and any other persistent storage that might contain computer program product 161, memory 410 may a non-transitory media (even if implemented as a typical volatile computer memory device). Moreover, those skilled in the art will appreciate that in addition to storing computer program product 161 for carrying out processing described herein, memory 410 and/or persistent storage device 470 may be configured to store various data elements disclosed or referenced and illustrated herein.

Those skilled in the art will appreciate computer or processing system 160 illustrates just one example of a system in which a computer program product in accordance with embodiments of the present invention may be implemented. To cite but one example of an alternative embodiment, execution of instructions contained in a computer program product in accordance with an embodiment of the present invention may be distributed over multiple computers, such as, for example, over the computers of a distributed computing network.

Figure 5:
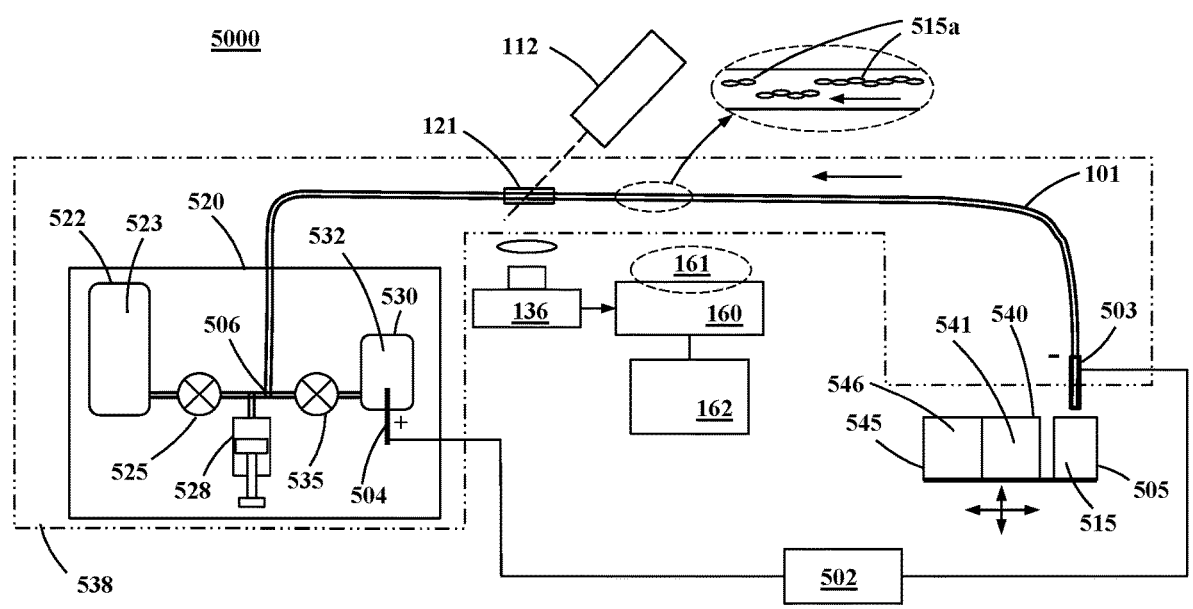
FIG. 5 illustrates a sample separation system (or instrument) in accordance with some embodiments of the disclosure.

Referring to FIG. 5, in certain embodiments, a sample separation system or instrument 5000, such as a capillary electrophoresis (CE) instrument, is configured for separating biological molecules, for example, for separating sample nucleotide molecules or sample amino acid molecule according to length of the different molecules. Where possible, embodiments of system 5000, as well as methods, elements, and/or parameter values associated with system 5000, may be incorporated into embodiments of system 1000 and into methods, elements, and/or parameter values associated with system 1000. Conversely, where possible, embodiments of system 1000, as well as methods, elements, and/or parameter values associated with system 1000, may be incorporated into embodiments of system 5000 and into methods, elements, and/or parameter values associated with system 5000.

System 5000 comprises one or more capillaries 101, an electronic or voltage supply 502, one or more cathodes 503, one or more anodes 504, a sample source container 505, a sample destination container 506, radiant source 112, detection system 136, and processing system 160 including a data processing system configured by computer program product 161, and display or output device 162. Instrument 5000 may include multiple capillaries 101 (e.g., four capillaries 101, as shown in FIG. 1); however, only one capillary 101 is illustrated in FIG. 5 for simplicity. Configurations of instrument 5000 may include 1, 2, 4, 8, 10, 12, 16, 24, 32, 48, 65, 96, 128, 256, 384, or more than 384 capillaries. Sample separation could also be performed by other means including using gel electrophoresis and microfluidics, such as on a lab-on-a-chip.

System 5000 may be used to perform a capillary electrophoresis or other sample separation assay, experiment, or process. A sample mixture or solution 515 containing various samples or sample molecules 515a is first prepared in or delivered into sample source container 505. At least a portion of sample mixture 515 is subsequently loaded into cathode 503 end of capillary 101, for example using a pump or syringe, or by applying a charge or electric field to capillary 101. Once loaded into the anode end of capillary 101, voltage supply 502 creates a voltage difference between cathode 503 and anode 504. The voltage difference causes negatively charged, dye-labeled samples 515a to move from sample source container 505 to sample destination container 506. During the assay, process, test, or experiment, various samples (e.g., nucleotides or amino acid molecules) pass through an optical detection zone 516 and are illuminated by radiant source 112 to produce respective emissions, for example fluorescent emissions produced by fluorescent dyes, probes, or markers attached to the target molecules or molecules of interest. The emissions may be configured to indicate the presence or amount of target molecules or molecules of interest. Longer and/or less charged dye-labeled samples 515a move at a slower rate through capillary 101 than do shorter and/or higher charged dye-labeled samples, thereby creating some separation between samples of varying lengths and charges. As each of samples 515a passes through an excitation beam generated by radiant source 112, a dye on a leading element (a leading element might, e.g., be a nucleotide) of a sample 515a exhibits fluorescence that is detected by detection system 136. Detection system 136 may be coupled to provide signals to processing system 160 in response to detected fluorescence. In particular, detection system 136 passes a signal to processing system 160 corresponding to the intensity of emissions received at various wavelengths scanned by detection system 136. Computer program product 161 configures data processing system 160 to process the received spectral data and may, for example during runtime of instrument 5000, calibrate instrument 5000 to correct for spectral error, for example, as disclosed in U.S. provisional patent application No. 62/460,700. A display or other output device 162 is coupled to processing system 160 and may be used to display or report data related to the assay, process, test, or experiment such as run parameter values, spectral data, run condition data, run quality data, warning flags, and the like, for example, as disclosed in U.S. provisional patent application No. 62/463,551.

In certain embodiments, system 5000 comprises a delivery system 520 comprising a polymer reservoir 522 containing a polymer or polymer solution 523, a polymer valve 525, and a pump 528 (e.g., a syringe) configured to receive or draw polymer 523 from polymer reservoir 522 and to pump or load polymer 523 into capillary 101. Delivery system 520 further comprises a buffer reservoir 530 containing a buffer solution 532 and a buffer valve 535. In the illustrated embodiment, buffer reservoir contains the one or more anodes 504. In certain embodiments, all or some of components of delivery system 520 are part of a cassette or cartridge 538 that may further comprise capillaries 101, cartridge 538 may also comprise the one or more cathodes 503 (e.g., one cathode 503 for each of a plurality of capillaries 101). Examples of cassette or cartridges suitable for use with embodiments of the present invention are disclosed in U.S. provisional patent application No. 62/463, 467.

In certain embodiments, the sample separation assay, process, test, or experiment comprises the following activities:

Locate cathode 503 end of capillaries 101 into wash/waste buffer container 540 containing a wash/waste buffer solution 541.

Close buffer valve 535, open polymer valve 525.

Aspirate (draw) polymer solution 523 from polymer reservoir 522 into syringe 528.

Close polymer valve 525 (buffer valve 535 remains closed).

Dispense (deliver) polymer 523 to capillaries 101 using syringe 528.

Locate cathode 503 end of capillaries 101 into sample source container 505.

Draw at least a portion of sample solution 515 into cathode 503 end of capillaries 101 by inducing a current flow from cathode 503 to anode 504 (referred to as electrokinetic injection).

Locate cathode 503 end of capillaries 101 into run a buffer container 545 containing a run buffer solution 546.

Open buffer valve 535 to provide electrical coupling between anode 504 and capillaries 101 (polymer valve 525 remains closed).

Run capillary electrophoresis assay, process, test, or experiment.

Locate cathode 503 end of capillaries 101 into a wash/waste buffer container 540.

Close buffer valve 535.

Optionally open polymer valve 525.

Optionally aspirate (draw) polymer solution 523 from polymer reservoir 522 into syringe 528.

Optionally close polymer valve 525 if open.

Clean capillaries 101 by dispensing (delivering) polymer 523 to capillaries 101 using syringe 528.

Repeat above steps for new separation assay, process, test, or experiment.

Figure 6:
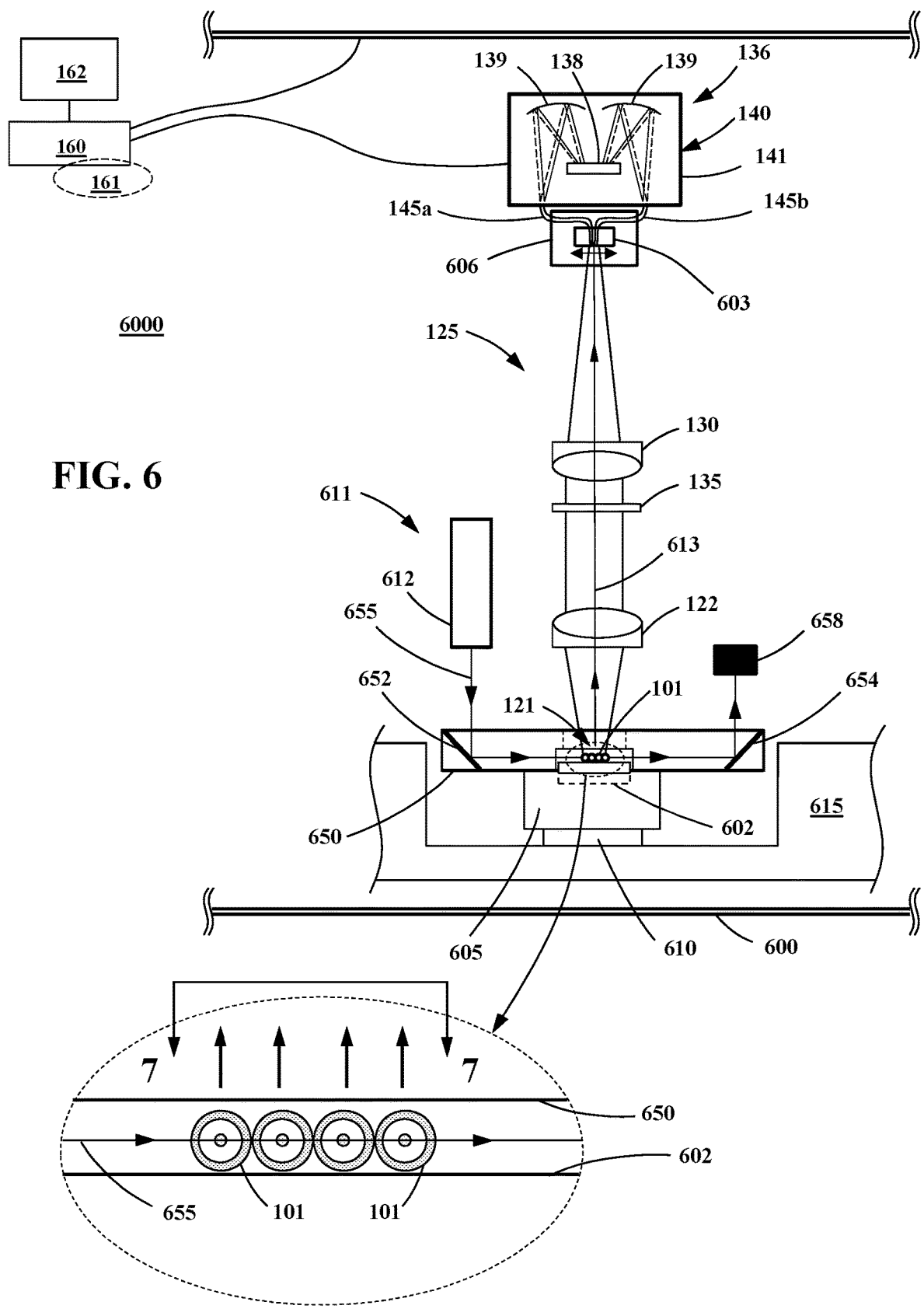
FIG. 6 illustrates another sample separation system (or instrument) in accordance with some embodiments of the disclosure.

Referring to FIG. 6, in certain embodiments a system or instrument 6000, such as a capillary electrophoresis (CE) instrument, is configured separating biological molecules, for example, for separating sample nucleotide molecules or sample amino acid molecule according to length of the different molecules. Where possible, embodiments of system 6000, as well as methods, elements, and/or parameter values associated with systems 1000, 5000, may be incorporated into embodiments of systems 1000, 5000 and into methods, elements, and/or parameter values associated with systems 1000, 5000. Conversely, where possible, embodiments of systems 1000, 5000, as well as methods, elements, and/or parameter values associated with system 6000, may be incorporated into embodiments of system 6000 and into methods, elements, and/or parameter values associated with system 6000.

System 6000 comprises a housing or enclosure 600 and detection system 136 shown in FIG. 1 that may be disposed within housing 600. Detection system 136 comprises a plurality of optical fibers 145, the receiving ends of which are coupled, mounted, or attached to an optical fiber mount 603. The receiving ends of optical fibers 145 are configured to receive emissions from optical detection zone 121 of respective ones of capillaries 101. System 6000 also comprises computer processing system 160, computer program product 161, and display or other output device 162. System 6000 further comprises a plurality of capillaries 101 comprising optical detection zone 121, which are coupled, mounted, or attached to a capillary mount 602. In certain embodiments, capillary mount 602 may be held or supported by a support structure 605 that in turn is mounted or attached to a base 610.

System 6000 further comprises emission optical system 125 and an excitation optical system 611 comprising any or all of a radiant source 612. Emission optical system 125 comprises lenses 122, 130 that are disposed along an optical axis or path 613 between capillaries 101 and the entrance end of optical fibers 145. Lens 122 is configured to collect emission light from each of the capillaries 101 and lens 130 is configured to reimage the emissions from each of the one or more capillaries 101 to a spot or focus in image plane of emission optical system 125 that is at or near the input or receiving ends of optical fibers 145; however, other optical configurations known in the art may be used for these purposes.

Figure 7:
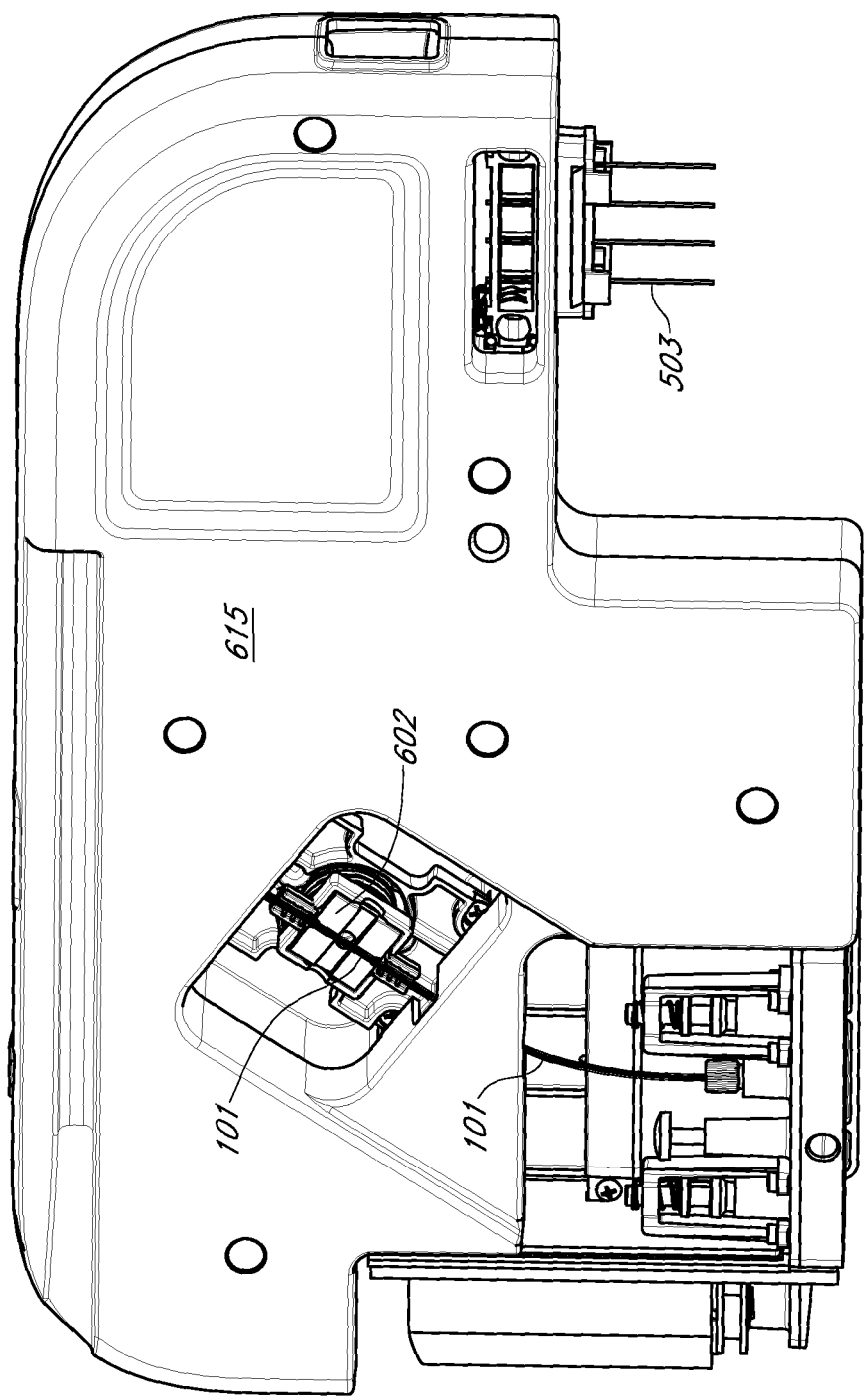
FIG. 7 illustrates a cartridge or cassette that can be used to contain and/or support components of a sample separation system or instrument, such as those shown in FIG. 6 and FIG. 7, in accordance with some embodiments of the disclosure.

With further reference to FIG. 7, capillaries 101 and capillary mount 602 may be part of a cartridge or cassette 615 that may also include support structure 605 and base 610. Base 610 may be mounted or attached to cartridge 615. Cartridge 615 may be removed from system 6000 and replaced by another cartridge 615' (not shown) that is configure the same or similar to cartridge 615 shown in FIGS. 6 and 7. In certain embodiments, cartridge 615' (not shown) may have the same or similar form, but contain modified or different elements than cartridge 615. For example, cartridge 615' (not shown) may have more or fewer capillaries 101 than the four capillaries 101 of cartridge 615, for example, 1, 2, or 8 capillaries 101.

Capillaries 101 may be coupled, mounted, or attached to capillary mount 602 such that portions of capillaries within optical detection zone 121 are fixedly located relative to one another. In similar fashion to capillaries 101, optical fibers 145 may be coupled, mounted, or attached to optical fiber mount 603 such that the input or receiving ends of optical fibers 145 are fixedly located relative to one another. It has been discovered that fixedly mounting capillaries 101 and the receiving ends of optical fibers 145 advantageously simplifies alignment between of optical fibers 145 with respective capillaries 101. This arrangement also has been found to improve the accuracy and durability of the alignment between optical fiber 145 and capillaries 101.

Figure 8:
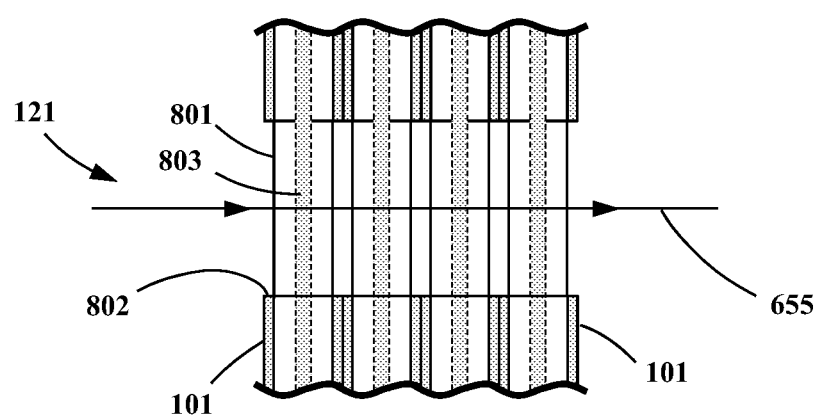
FIG. 8 illustrates further details of the system of FIG. 6 in accordance with some embodiments of the disclosure.

Referring to FIGS. 6 and 8, in certain embodiments, each capillary 101 comprises capillary core 801 made of a core material and an outer coating or layer 802 surrounding capillary core 801. For example, capillary core 801 may comprise fused silica and outer layer 802 may comprise a polyimide coating. The central portion of capillary core 801 comprises a channel 803 through which sample solution and molecules are contained. In such embodiments, for example, when outer layer 802 comprises a material that is optically opaque or translucent, optical access to material located in channel 803 may be provided by removing outer layer 802 along the portion of capillary 101 within optical zone 121. As illustrated in FIG. 8 and the magnified view of FIG. 6, in certain embodiments, capillaries 101 are mounted to capillary mount 602 so that out layers 802 of adjacent capillaries 101 touch or contact one another. In this way, it has been discovered that the spacing between channels can be easily and accurately provided and maintained. Alternatively, spacers of predetermined thickness may be place between at least two adjacent capillaries on each side of optical detection zone 121. For example, spacer of differing thickness may be placed between different sets of adjacent capillaries to increase the accuracy of the spacing between adjacent capillaries 101 and/or to provide a predetermined spacing between adjacent capillaries 101. In other embodiments, capillaries 101 may be place in a fixture, such as a V-block, to provide a predetermined spacing between adjacent capillaries 101.

The outer diameter of capillaries 101 may be equal to or about 360 micrometers, for example, 363±10 micrometers. In certain embodiments, the outer diameter of capillaries 101 is from 100 micrometers to 1000 micrometer, for example, from 200 micrometers to 500 micrometers. In such embodiments, the diameter of channel 803 may be from 2 micrometers to 700 micrometers, for example, from 25 micrometers to 100 micrometers. In certain embodiments, the thickness of outer layer 802 is from 12 micrometers to 24 micrometers, for example, from 16 micrometers to 24 micrometers. In certain embodiments, the outer diameter of each capillary 101 is 363±10 micrometers, the diameter of channel 803 is 50±3 micrometers, and the thickness of outer layer 802 is 20 micrometers.

In certain embodiments, optical fiber mount 603 is coupled, mounted, or attached to a motion or translation stage 606. In use, capillaries 101 may be easily aligned using an alignment method comprising:

- Producing a first alignment signal from detector 138 by transferring emissions from one or more of capillaries 101 within optical detection zone through a respective one or more of optical fiber 145 and to detector 138.
- Using translation stage 606, moving the optical fiber mount 603 one or more times to one or more different locations capillary mount or the fiber mount;
- At each of the one or more locations, producing a respective alignment signal from detector 138 by transferring emissions from one or more capillaries 101 within optical detection zone 121 through the one or more optical fibers 145 to detector 138;
- Using translation stage 606, aligning capillaries 101 to the receiving ends of the plurality of capillaries based on the alignment signals.

In certain embodiments, the alignment signal comprises a measured signal from detector 138 based on emissions from a single one of the capillaries 101. Additionally or alternatively, the alignment signal comprises a measured signal from detector 138 based on emissions from a more than one of the capillaries 101, for example, based on an average emission from all or some of the capillaries 101.

It has been discovered that this alignment method advantageously allows all the capillaries to be simultaneously aligned to the respective optical fibers 145 and, as a consequence, to be simultaneously aligned to the same corresponding areas on detector 138 each time the alignment method is performed. The reason emissions from each capillary 101 illuminate the same corresponding areas on detector 138 each time is because the output (or emitting or distal) ends of each optical fiber 145 are in a fixed position relative to detector 138. Therefore, emitted emissions from the output end of optical fibers 145 will travel the same path each time to detector 138. When capillaries 101 need to be replaced by a new set of capillaries 101 and the alignment method rerun, the new capillaries 101 will have the same or nearly the same spacing between capillaries as the old set of capillaries 101. Thus, when the disclosed alignment method is performed again, the only emissions from capillaries 101 received at detector 138 are those emission that pass from the same output ends of optical fibers 145. In prior art systems that directly reimage capillary emissions (i.e., systems that do not use the optical fiber arrangement disclosed herein), slight changes in a new, replacement set of capillaries will cause emissions from the new set of capillaries to be reimaged onto slightly different portions of the detector. Because of this, the detector itself in non-optical fiber based systems must be recalibrated each time, since different areas or, for example, pixels of a CCD or CMOS array detector, have different sensitivities. Therefore, because of the inventive use of optical fibers 145 in combination with the fixed mounting configurations of capillaries 101 and optical fibers 145, no recalibration of detector 138 is necessary when a replacement set of capillaries 101 is used.

In the illustrated embodiment shown in FIG. 6, translation stage 606 is used to translate or move the input ends of optical fibers 145 in a transverse direction during the above alignment method. Additionally or alternatively, capillary mount 602 may be attached to a motion or translation stage and move instead of, or in addition to, translation stage 606. In other embodiments, relative motion between capillaries 101 and optical fibers 145 may be accomplished during the alignment method above by making changes to emission optical system 125. For example, a turning mirror or an additional refractive element may be place in the optical path from capillaries 101 and optical fibers 145. Adjusting the turning mirror or additional refractive element can then be used to move the reimaged emissions from capillaries 101 and so align the reimaged emissions to the receiving ends of optical fibers 145. In other embodiments, the alignment method can be implemented using longitudinal motion in place of or in addition to the transverse movement discussed above with translation stage 606, for example, in order to move the reimaged emissions toward or away from the input ends of optical fibers 145, thereby increasing the amount of emission entering optical fibers 145. In yet other embodiments, emission optical system 125 comprises a zoom lens or other optical elements configured to change the magnification of the reimaged emissions from capillaries 101, for example, to accommodate slight changes in spacing between different sets of capillaries 101 used in system 6000.

In certain embodiments, the alignment signal used in the above alignment method is produced due to Raman scattering of water molecules within one or more of the channels 803 of capillaries 101, for example, water molecules contained in a polymer solution used to conduct a capillary electrophoresis assay, process, test, or experiment. The use of Raman scattering from water molecules, which is typically a source of noise, has been unexpected discovered to be suitable for the above alignment method because this signal remains constant over time and, for example, between different filling of capillaries 101 with the polymer solution use in capillary electrophoresis. Because of the stability of this signal source, Raman scattering can also be used to calibrate detector 138, as well as provide alignment between capillaries 101 and optical fibers 145. In such embodiments, the signal produced by Raman scatter may be measured during or after the alignment method and the detector may then be calibrated based on the value of the measured signal from detector 138. In addition, the use of Raman scatter from water molecules allows the alignment method to be conducted before or after a sample has been introduced into the capillaries 101 for a capillary electrophoresis run or other sample separation assay, process, test, or experiment using system 6000. In other embodiments, the alignment method may be conducted during a sample separation assay, process, test, or experiment. In such embodiments, emissions from one or more of capillaries 101 may be used to adjust alignment during the assay, process, test, or experiment.

Figure 9:
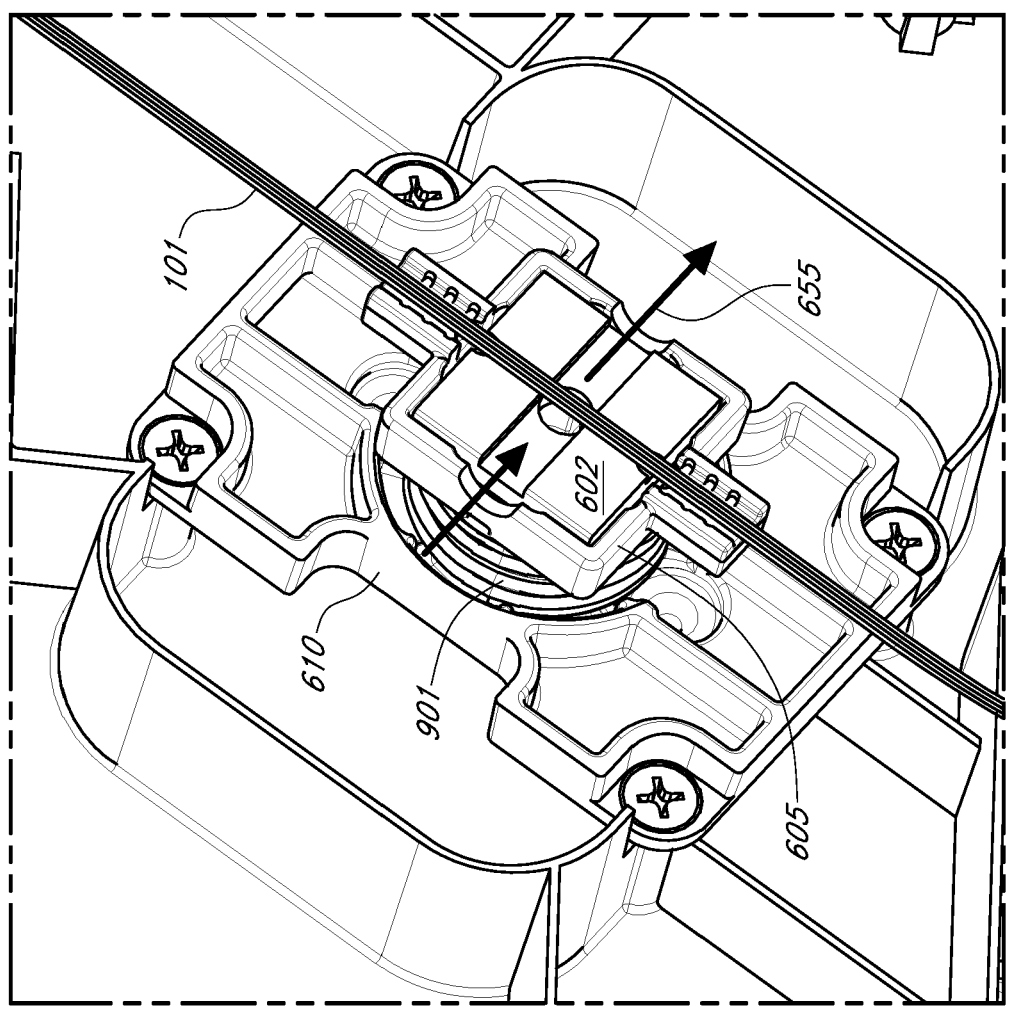
FIG. 9 illustrates further details of the system of FIG. 6 in accordance with some embodiments of the disclosure.
Figure 10:
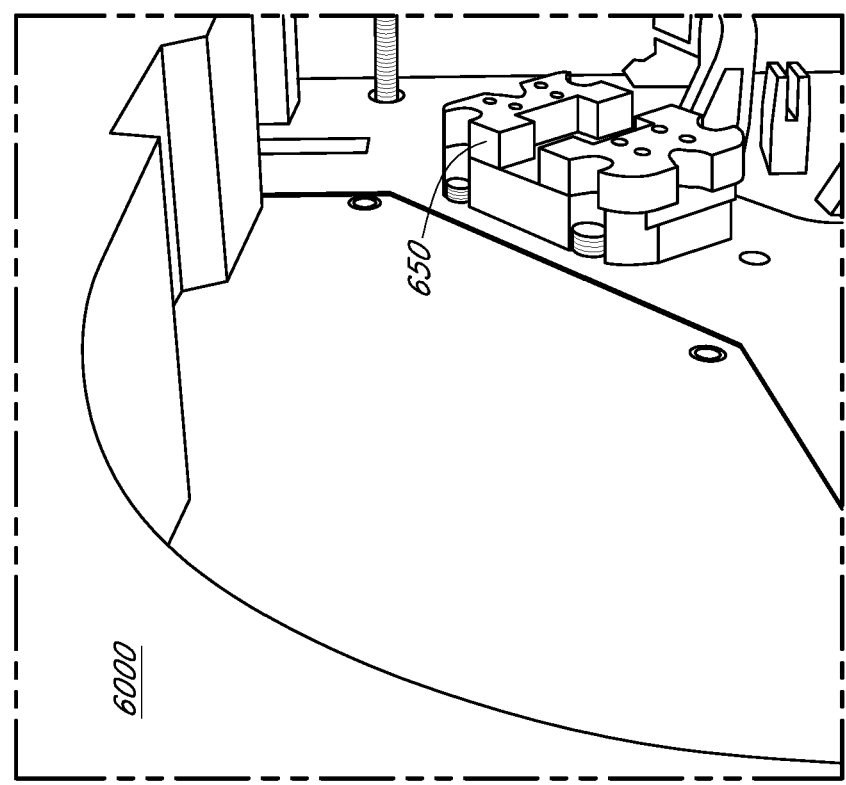
FIG. 10 illustrates further details of the system of FIG. 6 in accordance with some embodiments of the disclosure.

Referring to FIGS. 6, 9, and 10, in certain embodiments, system 6000 further comprises an optical interface, cover, or snout 650 that is configured to engage, interface, or mate with capillary mount 602 and/or support structure 605. As seen in FIG. 9, base 610 may comprise a spring 901, whereby capillary mount 602 and/or support structure 605 may be held against, mounted to, or engaged with optical interface 650 by a contact force that is determined by the amount of compression of spring 901 as cartridge 615 is placed or aligned within system 6000. Optical interface 650 may comprise turning mirror 652 and/or turning mirror 654, which are part of excitation optical system 611.

Mirrors 652, 654 may be configured to a guide a source, source, illumination, or excitation beam 655 from radiant source 612, through capillaries 101, and into a beam dump 658. Excitation optical system 611 may further comprise other optical elements not shown in FIG. 6, for example, lenses, prisms, polarizers, additional mirrors, and the like. For example, one or more lenses may be place along the optical path between radiant source 612 and capillaries 101 to condition source beam 655 to provide a predetermined illumination characteristic as it passes through the plurality of capillaries 101.

It has been discovered that mounting turning mirror 652 with optical interface 650 advantageously provides a more stable alignment of source beam 655 to capillaries 101, since any expansion or contraction along optical axis 613 of capillary mount 602 and/or support structure 605 due to temperature variations over time is compensated for the same or approximately the same movement of turning mirror 652 in the direction of optical axis 613. Thus, the position of source beam 655 through capillaries 101 remains constant or very stable with movement of the of the capillaries due to temperature change. If, for example, source beam 655 traveled directly from radiant source 612 to capillaries 101 (i.e., without first reflecting off turning mirror 652), the position of source beam 655 through capillaries 101 in the direction parallel to optical axis 613 would change as the location of capillaries 101 changed due to temperature variation in capillary mount 602 and/or support structure 605.

In certain embodiments, the source beam 655 comprises a linear polarization, either directly out of radiant source 612 or through the use of one or more polarization optical elements. It has been discovered that scatter from a polymer solution used in a sample separation assay, process, test, or experiment may be reduced or minimized when (1) the axis of polarization of source beam 655 perpendicular to the length of capillaries 101 and (2) the optics axis 613 of emission optical system 125 is parallel to the axis of polarization of source beam 655. Raman scattering is undesired and adds noise on top of the fluorescent signal from samples during a sample separation assay, process, test, or experiment. The fluorescent signal from samples usually generally less polarization sensitive. Therefore, the polarization criteria discover allows an increase in signal-to-noise ratio during use of system 6000.

Selected embodiments of the current invention may include, but are not limited to:

1. Embodiment 1 includes a system for separating biological molecules, the system comprising:
   a plurality of capillaries configured to separate biological molecules in a sample, each capillary comprising a detection portion configured to pass electromagnetic radiation into the capillary;
   a capillary mount, the plurality of capillaries coupled to the capillary mount such that the detection portions are fixedly located relative to one another;
   a plurality of optical fibers corresponding to the plurality of capillaries, each optical fiber comprising a receiving end configured to receive emissions from a respective one of the detection portions;
   a fiber mount, the optical fibers being coupled to the fiber mount such that the receiving ends of the optical fibers are fixedly located relative to one another;
   an emission optical system configured to direct emissions from the detection portions into the receiving ends of the optical fibers;
   a optical detector configured to produce an alignment signal when emissions from at least one of the plurality of capillaries is transmitted through a respective at least one of the optical fibers and onto the optical detector; and
   a motion stage configured to move to a plurality of locations, one or more of the capillary mount, the fiber mount, or at least a portion of the emission optical system;
   wherein the motion stage is configured to align the receiving ends of the optical fibers to the detection portions based on values of the alignment signal at the plurality of locations.

2. Embodiment 1, wherein the emission optical system comprises one or more lenses disposed along an optical path between the detection portions and the receiving ends.

3. Embodiment 1 or 2, wherein the motion stage comprises a translation stage configured to translate the motion stage within a plane parallel to the receiving ends of the optical fibers and/or parallel to a plane passing through the detection portions.

4. Any of embodiments 1-3, further comprising:
   a processor; and
   a memory encoded with instructions for:
   moving the motion stage to the plurality of locations;
   for each location, capturing one or more respective values of the alignment signal from the optical detector;
   determining an alignment position based on the respective values;
   moving the motion stage to the alignment position so that the detection portions are aligned to the receiving ends of the optical fibers.

5. Embodiment 4, wherein each of the values of the alignment signal comprises one or more of:
   an average signal from the optical detector for at least two of the capillaries;
   a mean signal from the optical detector for at least three of the capillaries;
   a signal from the optical detector corresponding to a highest emission from between at least two of the capillaries.

6. The system of claim 4, wherein the memory is further encoded to evaluate whether a signal from the optical detector corresponding to emissions from one or more of the capillaries is a noise signal and/or a signal not produced by Raman scattering from water molecules.

7. Any of embodiments 1-6, further comprising a first electrode and a second electrode, the electrodes configured to produce an electric potential across the capillaries 8. Any of embodiments 1-7, wherein each optical fiber comprises an outer coating surrounding the optical fiber at the receiving end, the outer coating of the optical fiber configured to reflect and/or absorb light from emission signal, wherein the outer coating is not present within the detection portion of each optical fiber.

9. Any of embodiments 1-8, wherein the capillaries are coupled to the capillary mount such that each capillary touches an adjacent capillary of the plurality of capillaries along a portion outside the detection portion.

10. Embodiment 10 includes a system for separating biological molecules, the system comprising:
    a plurality of capillaries configured to separate biological molecules in a sample, each capillary comprising a detection portion configured to pass electromagnetic radiation into the capillary;
    a capillary mount, the capillaries coupled to the capillary mount such that the detection portions are fixedly located relative to one another;
    a radiant source producing a source beam of electromagnetic radiation configured to illuminate the detection portions;
    a base configured to receive the capillary mount, the base comprising a mirror configured to reflect the source beam and to direct the source beam through the plurality of capillaries.

11. Embodiment 10, further comprising:
   a optical detector;
   an emission optical system configured to receive emission signals from the plurality of capillaries and to direct the emission signals to the optical detector.
12. Embodiment 10, further comprising:
   a spectrometer comprising a dispersive optical element and a optical detector;
   an emission optical system configured to receive emission signals from the plurality of capillaries and to direct the emission signals to the optical detector.
13. Embodiment 13 includes a system for separating biological molecules, the system comprising:
   a plurality of capillaries configured to separate biological molecules in a sample, each capillary comprising a detection portion configured to pass electromagnetic radiation into the capillary;
   a radiant source producing a source beam of electromagnetic radiation configured to illuminate the detection portions;
   wherein the source beam has a linear polarization disposed along a polarization axis;
   wherein the polarization axis of the source beam within the detection portions is perpendicular to the capillary plane.
14. Embodiment 14 includes a method of separating biological molecules, comprising:
   providing a plurality of capillaries, each capillary comprising an detection portion, the capillaries coupled to a capillary mount such that detection portions are fixedly located relative to one another;
   providing a plurality of optical fibers corresponding to respective ones of the plurality of capillaries, each optical fiber comprising a receiving end configured to receive emissions from a respective one of the detection portions, the optical fibers being coupled to a fiber mount such that the receiving ends are fixedly located relative to one another;
   producing values of an alignment signal from a optical detector by transferring emissions within the detection portion of at least one of the capillaries through a respective at least one of the optical fiber and to the optical detector;
   moving, one or more times to one or more different locations, the capillary mount or the fiber mount;
   at each of the one or more locations, producing a respective value of the alignment signal from the optical detector by transferring emissions within the detection portion of the at least one capillary through the at least one optical fiber to the optical detector;
   aligning the capillaries to the receiving ends of the plurality of optical fibers based on the values of the alignment signals.
15. Embodiment 14, further comprising:
   providing an emission optical system configured to direct emissions from each of the detection portions into the receiving end of the respective optical fiber; and
   moving, one or more times to one or more locations, at least one of: the capillary mount or the fiber mount, or the emission optical system.
16. Any of embodiments 14-15, wherein the values of the alignment signal are produced by Raman scattering emission from water molecules within a polymer solution contained in the capillaries.
17. Any of embodiments 14-16, wherein the values of the alignment signal comprise emissions from a single one the capillaries
18. Any of embodiments 14-17, wherein the values of the alignment signal comprise an average of the emissions from more than one of the capillaries.

19. Any of embodiments 14-18, further comprising:
   loading one or more samples containing a fluorescent molecule into the plurality of capillaries;
   propagating the one or more samples through the capillaries by producing an electric potential across the capillaries;
   illuminating each detection portion with a source beam of electromagnetic radiation to produce a plurality of emitted signals from the each of the detection portions;
   determining a nucleotide sequence of a molecule based on the plurality of emitted signals.
21. Embodiment 21 includes a system for separating biological molecules, the system comprising:
   a plurality of capillaries configured to separate biological molecules in a sample, the capillaries comprising an optical detection zone;
   a capillary mount, the capillaries being coupled to the capillary mount such that portions of the capillaries within the optical detection zone are fixedly located relative to one another;
   a plurality of optical fibers corresponding to the plurality of capillaries, each optical fiber comprising a receiving end configured to receive emissions from a respective capillary within the optical detection zone;
   a fiber mount, the optical fibers being coupled to the fiber mount such that the receiving ends of the optical fibers are fixedly located relative to one another;
   optionally, an emission optical system configured to direct emissions from each capillary within the optical detection zone into the receiving end of the respective optical fiber; and
   a optical detector configured to produce an alignment signal when emissions from at least one of the capillaries is transmitted through a respective at least one of the optical fibers and onto the optical detector;
   a motion stage coupled to one or more of the capillary mount, the fiber mount, or at least a portion of the optional emission optical system;
   wherein the motion stage and the optical detector are configured to align receiving ends of the optical fibers to the capillaries based on values of the alignment signal at a plurality of locations of the motion stage.
22. Embodiment 21, wherein the emission optical system comprises one or more lenses disposed along an optical path between the optical detection zone and the receiving ends.
23. Embodiment 21 or 22, wherein the motion stage comprises a translation stage configured to translate the motion stage within a plane parallel to the receiving ends of the optical fibers and/or parallel to a plane passing through each of the capillaries within the optical detection zone.
24. Any of embodiments 21-23, further comprising:
   a processor; and
   a memory encoded with instructions for:
      capturing a first alignment signal from the optical detector for emissions within optical detection zone from the at least one capillary;
      moving the motion stage to one or more different locations;
      for each of the one or more different locations, capturing one or more respective alignment signals from the optical detector for emissions within optical detection zone from the at least one capillary;
      determining an alignment position based on the alignment signals;

moving the motion stage to the alignment position so that the capillaries within the optical detection zone are aligned to the receiving ends of the plurality of capillaries.

25. Embodiment 24, wherein the alignment signal comprises one or more of:
   an average signal from the optical detector for at least two of the capillaries;
   a mean signal from the optical detector for at least three of the capillaries;
   a signal from the optical detector corresponding to a highest emission from between at least two of the capillaries.

26. The system of claim 24, wherein the memory is further encoded to evaluate whether a signal from the optical detector corresponding to emissions from one or more of the capillaries is a noise signal and/or a signal not produced by Raman scattering from water molecules.

27. Any of embodiments 21-26, further comprising a first electrode and a second electrode, the electrodes configured to produce an electric potential across the capillaries.

28. Any of embodiments 21-27, wherein each optical fiber comprises an outer coating surrounding the optical fiber at the receiving end, the outer coating of the optical fiber configured to reflect and/or absorb light from emission signal.

29. Any of embodiments 21-28, wherein the capillaries are coupled to the capillary mount such that each capillary touches an adjacent capillary of the plurality of capillaries along a portion outside the optical detection zone.

30. Embodiment 30 includes a system for separating biological molecules, the system comprising:
   a plurality of capillaries configured to separate biological molecules in a sample, the capillaries comprising an optical detection zone;
   a capillary mount, the plurality of capillaries being fixedly attached to the capillary mount;
   a light source producing a source beam of electromagnetic radiation configured to illuminate the plurality of capillaries within the optical detection zone;
   a base configured to receive the capillary mount, the base comprising a mirror configured to reflect the source beam and to direct the source beam through the plurality of capillaries.

31. Embodiment 30, further comprising:
   a optical detector;
   an emission optical system configured to receive emission signals from the plurality of capillaries and to direct the emission signals to the optical detector.

32. Embodiment 30, further comprising:
   a spectrometer comprising a dispersive optical element and a optical detector;
   an emission optical system configured to receive emission signals from the plurality of capillaries and to direct the emission signals to the optical detector.

33. Embodiment 33 includes a system for separating biological molecules, the system comprising:
   a plurality of capillaries configured to separate biological molecules in a sample, the capillaries comprising an optical detection zone defining a capillary plane;
   a light source producing a source beam of electromagnetic radiation configured to illuminate the plurality of capillaries within the optical detection zone;
   wherein each of the source beam has a linear polarization disposed along a polarization axis;
   wherein the polarization axis of the source beam within the optical detection zone is perpendicular to the capillary plane.

34. Embodiment 34 includes a method of separating biological molecules, comprising:
   providing a plurality of capillaries comprising an optical detection zone, the capillaries coupled to a capillary mount such that portions of the capillaries within the optical detection zone are fixedly located relative to one another;
   providing a plurality of optical fibers corresponding to the plurality of capillaries, each optical fiber comprising a receiving end configured to receive emissions from a respective capillary within the optical detection zone, the optical fibers being coupled to a fiber mount such that the receiving ends are fixedly located relative to one another;
   producing a first alignment signal from a optical detector by transferring emissions within the optical detection zone from at least one of the capillaries through a respective at least one of the optical fiber and to the optical detector;
   moving one or more times to one or more different locations at least one of: the capillary mount or the fiber mount;
   at each of the one or more locations, producing a respective alignment signal from the optical detector by transferring emissions within the optical detection zone from the at least one capillary through the at least one optical fiber to the optical detector;
   aligning the capillaries to the receiving ends of the plurality of capillaries based on the alignment signals.

35. Embodiment 34 or 35, further comprising:
   providing an emission optical system configured to direct emissions from each of the capillaries within the optical detection zone into the receiving end of the respective optical fiber; and
   moving one or more times to one or more locations at least one of: the capillary mount or the fiber mount, or the emission optical system.

36. Any of embodiments 34-35, wherein the alignment signals are produced by Raman scattering emission from water molecules within a polymer solution contained in the capillaries.

37. Any of embodiments 34-36, wherein the alignment signals comprise emissions from a single one the capillaries.

38. Any of embodiments 34-37, wherein the alignment signals comprise an average of the emissions from more than one of the capillaries.

39. Any of embodiments 34-38, further comprising:
   loading one or more samples containing a fluorescent molecule into the plurality of capillaries;
   propagating the one or more samples through the capillaries by producing an electric potential across the capillaries;
   illuminating each capillary within the optical detection zone with a source beam of electromagnetic radiation to produce an emitted signal from the each of the capillaries;
   receiving the emitted signal from the at least one spot into at least one of the optical fibers.

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover modifications and alternate constructions coming within the spirit and scope of the invention as generally expressed by the following claims, which particularly point out and distinctly claim the subject matter of the invention.

What is claimed is:

1. A system for separating biological molecules, the system comprising:
    a plurality of capillaries configured to separate biological molecules in a sample, each capillary comprising a detection portion configured to pass electromagnetic radiation into the capillary;
    a capillary mount, the plurality of capillaries coupled to the capillary mount such that the detection portions are fixedly located relative to one another;
    a plurality of optical fibers corresponding to the plurality of capillaries, each optical fiber comprising a receiving end configured to receive emissions from a respective one of the detection portions;
    a fiber mount, the optical fibers being coupled to the fiber mount such that the receiving ends of the optical fibers are fixedly located relative to one another;
    an emission optical system configured to direct emissions from the detection portions into the receiving ends of the optical fibers;
    an optical detector configured to produce an alignment signal when emissions from at least one of the plurality of capillaries is transmitted through a respective at least one of the optical fibers and onto the optical detector; and
    a motion stage configured to move to a plurality of locations, one or more of the capillary mount, the fiber mount, or at least a portion of the emission optical system;
    wherein the motion stage is configured to align the receiving ends of the optical fibers to the detection portions based on values of the alignment signal at the plurality of locations.

2. The system of claim 1, wherein the emission optical system comprises one or more lenses disposed along an optical path between the detection portions and the receiving ends.

3. The system of claim 1, wherein the motion stage comprises a translation stage configured to translate the motion stage within a plane parallel to the receiving ends of the optical fibers and/or parallel to a plane passing through the detection portions.

4. The system of claim 1, further comprising:
    a processor; and
    a memory encoded with instructions for:
    moving the motion stage to the plurality of locations;
    for each location, capturing one or more respective values of the alignment signal from the optical detector;
    determining an alignment position based on the respective values;
    moving the motion stage to the alignment position so that the detection portions are aligned to the receiving ends of the optical fibers.

5. The system of claim 4, wherein each of the values of the alignment signal comprises one or more of:
    an average signal from the optical detector for at least two of the capillaries;
    a mean signal from the optical detector for at least three of the capillaries;
    a signal from the optical detector corresponding to a highest emission from between at least two of the capillaries.

6. The system of claim 4, wherein the memory is further encoded to evaluate whether a signal from the optical detector corresponding to emissions from one or more of the capillaries is a noise signal and/or a signal not produced by Raman scattering from water molecules.

7. The system of claim 1, further comprising a first electrode and a second electrode, the electrodes configured to produce an electric potential across the capillaries.

8. The system of claim 1, wherein each optical fiber comprises an outer coating surrounding the optical fiber at the receiving end, the outer coating of the optical fiber configured to reflect and/or absorb light from emission signal, wherein the outer coating is not present within the detection portion of each optical fiber.

9. The system of claim 1, wherein the capillaries are coupled to the capillary mount such that each capillary touches an adjacent capillary of the plurality of capillaries along a portion outside the detection portion.

10. A system for separating biological molecules, the system comprising:
    a plurality of capillaries configured to separate biological molecules in a sample, each capillary comprising a detection portion configured to pass electromagnetic radiation into the capillary;
    a radiant source producing a source beam of electromagnetic radiation configured to illuminate the detection portions;
    wherein the source beam has a linear polarization disposed along a polarization axis;
    wherein the polarization axis of the source beam within the detection portions is perpendicular to the capillary plane.

11. A method of separating biological molecules, comprising:
    providing a plurality of capillaries, each capillary comprising a detection portion, the capillaries coupled to a capillary mount such that detection portions are fixedly located relative to one another;
    providing a plurality of optical fibers corresponding to respective ones of the plurality of capillaries, each optical fiber comprising a receiving end configured to receive emissions from a respective one of the detection portions, the optical fibers being coupled to a fiber mount such that the receiving ends are fixedly located relative to one another;
    producing values of an alignment signal from a optical detector by transferring emissions within the detection portion of at least one of the capillaries through a respective at least one of the optical fiber and to the optical detector;
    moving, one or more times to one or more different locations, the capillary mount or the fiber mount;
    at each of the one or more locations, producing a respective value of the alignment signal from the optical detector by transferring emissions within the detection portion of the at least one capillary through the at least one optical fiber to the optical detector;
    aligning the capillaries to the receiving ends of the plurality of optical fibers based on the values of the alignment signals.

12. The method of claim 11, further comprising:
    providing an emission optical system configured to direct emissions from each of the detection portions into the receiving end of the respective optical fiber; and
    moving, one or more times to one or more locations, at least one of: the capillary mount or the fiber mount, or the emission optical system.

13. The method of claim 11, wherein the values of the alignment signal are produced by Raman scattering emission from water molecules within a polymer solution contained in the capillaries.

14. The method of claim 11, wherein the values of the alignment signal comprise emissions from a single one the capillaries.

15. The method of claim 11, wherein the values of the alignment signal comprise an average of the emissions from more than one of the capillaries.

16. The method of claim 11, further comprising:
- loading one or more samples containing a fluorescent molecule into the plurality of capillaries;
- propagating the one or more samples through the capillaries by producing an electric potential across the capillaries;
- illuminating each detection portion with a source beam of electromagnetic radiation to produce a plurality of emitted signals from the each of the detection portions;
- determining a nucleotide sequence of a molecule based on the plurality of emitted signals.

* * * * *

UNITED STATES PATENT AND TRADEMARK OFFICE
CERTIFICATE OF CORRECTION

| | |
|---|---|
| PATENT NO. | : 11,604,162 B2 |
| APPLICATION NO. | : 16/488328 |
| DATED | : March 14, 2023 |
| INVENTOR(S) | : Shaohong Wang |

It is certified that error appears in the above-identified patent and that said Letters Patent is hereby corrected as shown below:

In the Claims

In Column 22, Claim 11, Line 46, delete "a optical" and insert -- an optical --, therefor.

In Column 23, Claim 14, Line 6, delete "one the" and insert -- one of the --, therefor.

Signed and Sealed this
Ninth Day of May, 2023

*Katherine Kelly Vidal*

Katherine Kelly Vidal
*Director of the United States Patent and Trademark Office*